No. 654,491. Patented July 24, 1900.
H. B. ROBINSON.
ACETYLENE GAS GENERATOR.
(Application filed Nov. 16, 1899.)
(No Model.) 4 Sheets—Sheet 1.
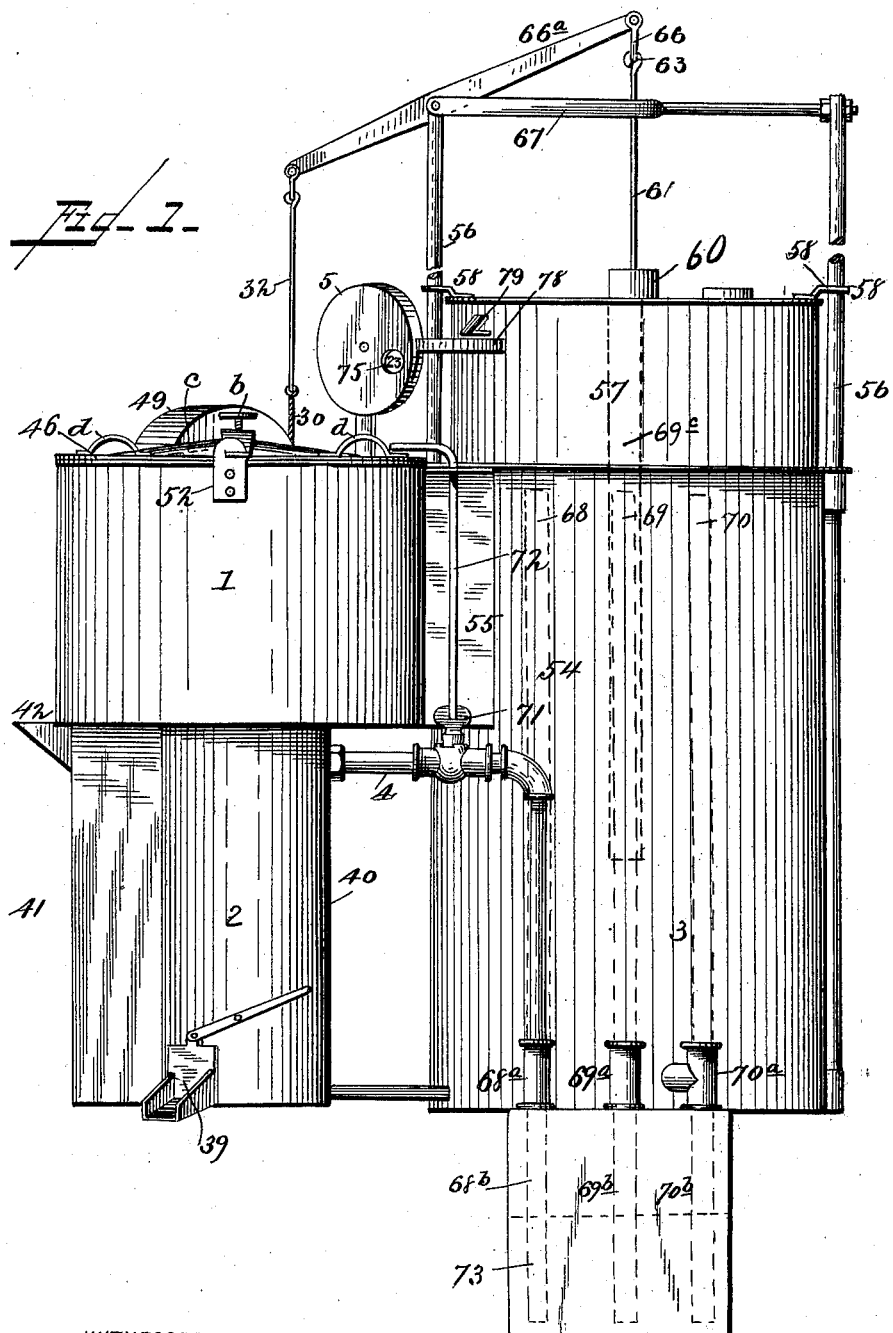
WITNESSES:
INVENTOR: Harriet B. Robinson,
BY Louis Bagger & Co
ATTORNEYS

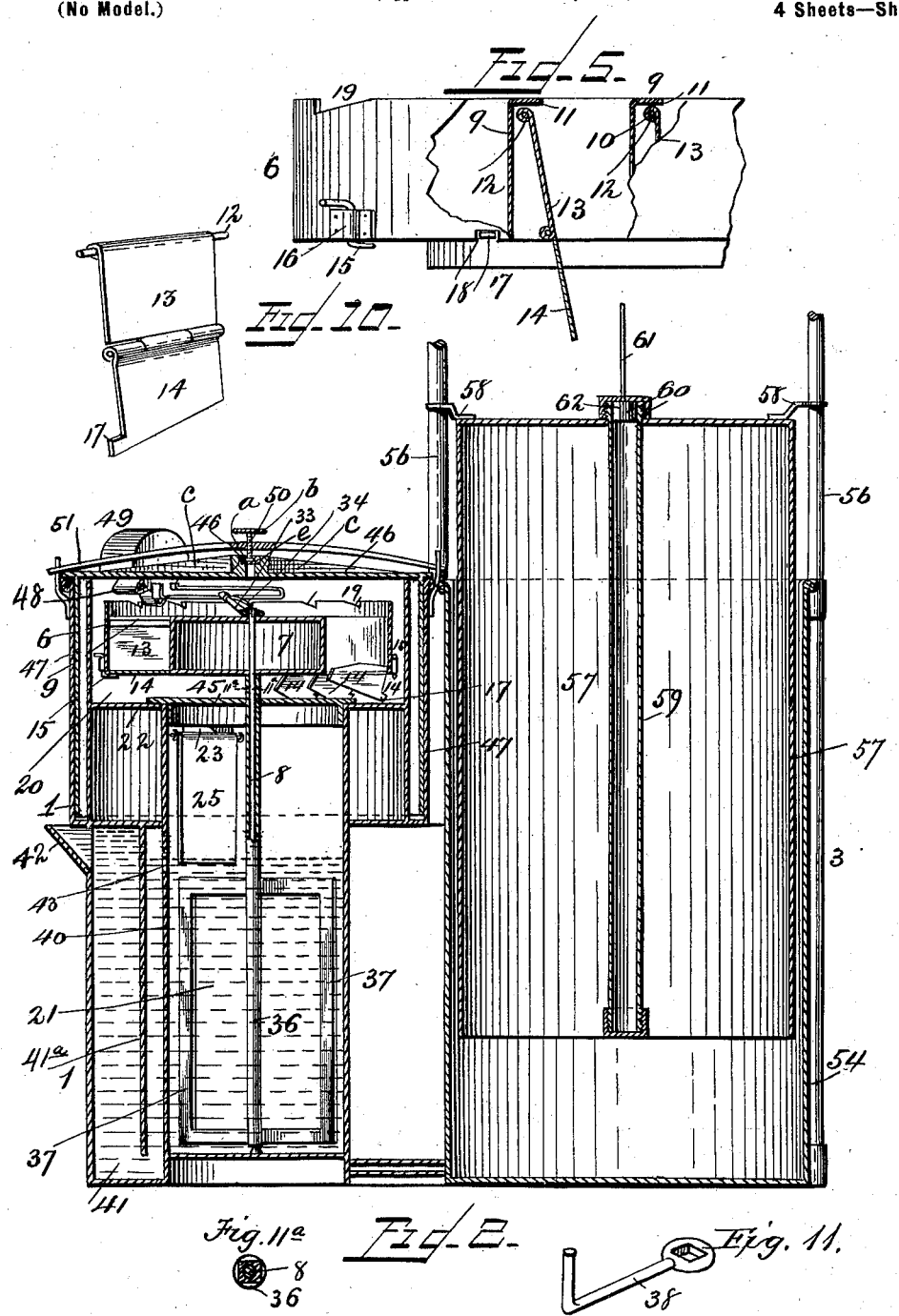

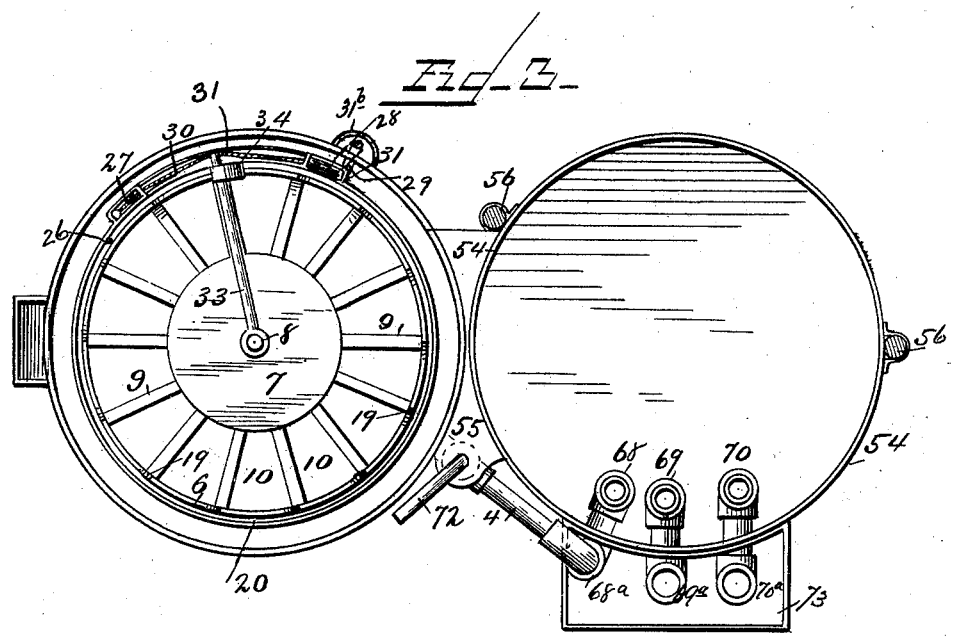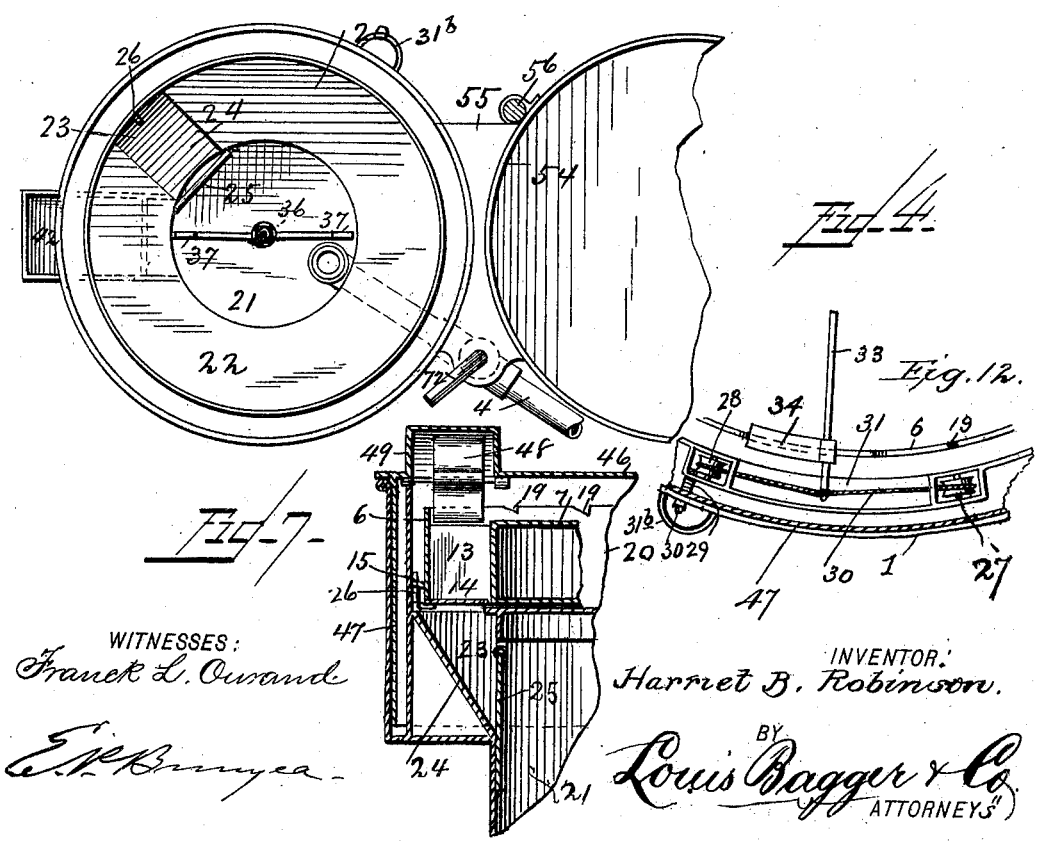

No. 654,491. Patented July 24, 1900.
H. B. ROBINSON.
ACETYLENE GAS GENERATOR.
(Application filed Nov. 16, 1899.)
(No Model.) 4 Sheets—Sheet 4.
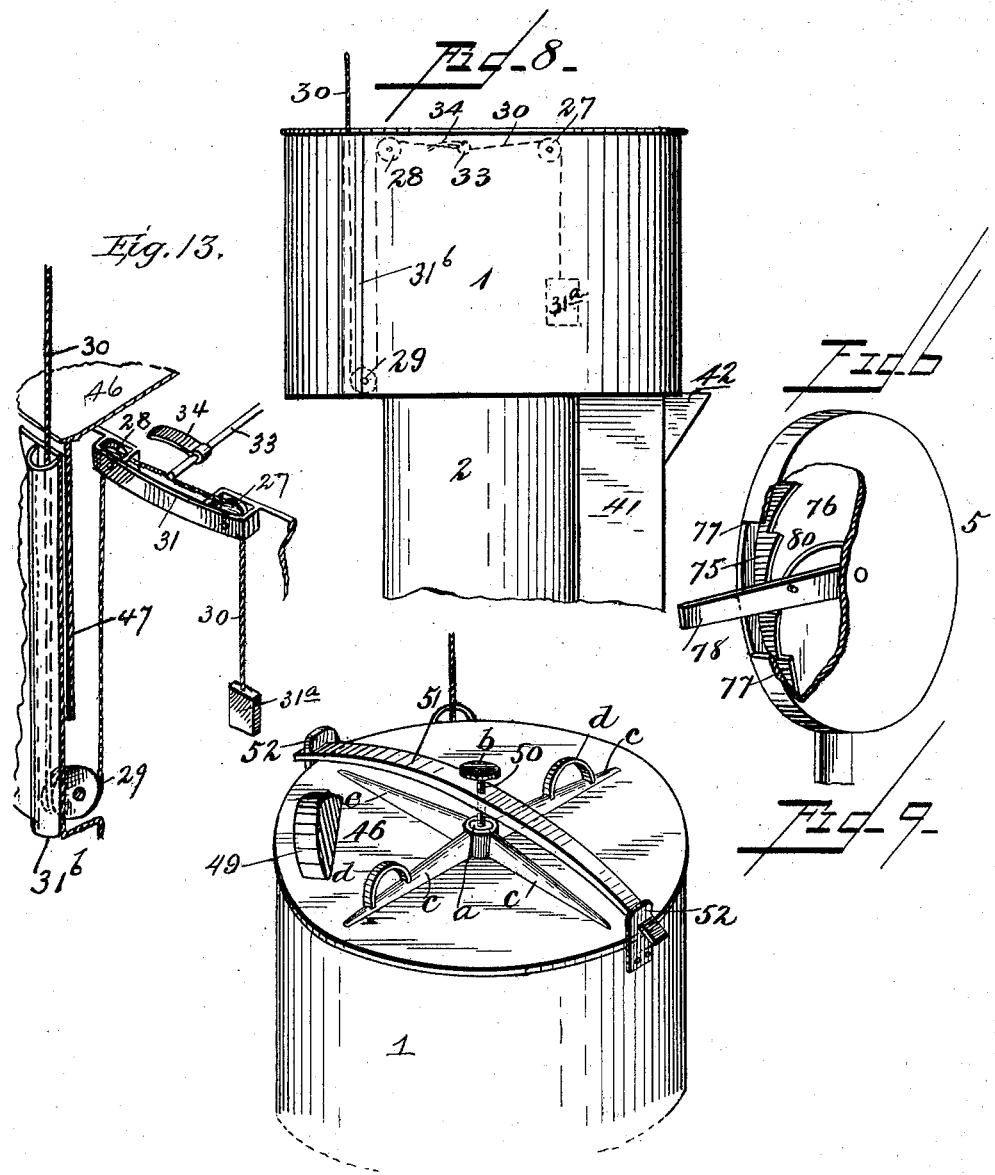
WITNESSES:
Franck L. Ourand
E. R. Brunger
INVENTOR:
Harriet B. Robinson.
BY
Louis Bagger & Co.
ATTORNEYS.

UNITED STATES PATENT OFFICE.

HARRIET B. ROBINSON, OF MILFORD CENTER, OHIO.

ACETYLENE-GAS GENERATOR.

SPECIFICATION forming part of Letters Patent No. 654,491, dated July 24, 1900.

Application filed November 16, 1899. Serial No. 737,159. (No model.)

*To all whom it may concern:*

Be it known that I, HARRIET B. ROBINSON, a citizen of the United States, residing at Milford Center, in the county of Union and State of Ohio, have invented new and useful Improvements in Acetylene-Gas Machines, of which the following is a specification.

My invention relates to acetylene-gas machines; and one of the principal objects of the same is to provide means for automatically feeding a definite quantity of carbid to the generator at intervals depending upon the quantity of gas in the gasometer; or, in other words, my invention contemplates automatic devices for discharging a predetermined quantity of carbid into the generator at times when the gas is running low in the gasometer, the intervals of discharge of the carbid to the generator being thus made dependent upon the volume or quantity of gas used from the gasometer.

In the accompanying drawings, which form a part of this specification, Figure 1 is a front elevation of an apparatus made in accordance with my invention. Fig. 2 is a vertical section of the generator. Fig. 3 is a plan view of my gas-machine, the bell and cover being removed, showing the carbid-cells in the feed-wheel. Fig. 4 is a detail plan view of the generator, the feed-wheel being removed. Fig. 5 is a detailed sectional view of the feed-wheel, showing one of the bottoms dropped down. Fig. 6 is a perspective view of the indicator, partly broken away. Fig. 7 is a detail sectional view of the feed-wheel compartment. Fig. 8 is an elevation of carbid-chamber, showing the pulley and weight. Fig. 9 is a detail perspective view of the top of the carbid-chamber. Fig. 10 is a view of one of the partitions and doors of the carbid-cells. Fig. 11 is a view of the crank. Fig. 11$^a$ is a section on the line 11$^a$ 11$^a$, Fig. 2. Fig. 12 is a detailed plan and partial section of the upper portion of the carbid-chamber. Fig. 13 is a detail perspective of the pulleys, cord, and weight for operating the feed-wheel.

Like characters of reference designate like parts wherever they occur in the various views of the drawings.

Referring to Fig. 1 of the drawings, the numeral 1 designates the feeding-chamber; 2, the generator; 3, the gasometer; 4, the pipe leading from the generator to the gasometer, and 5 the indicator or gage.

The feed-wheel for discharging the carbid at intervals into the generator consists of a peripheral rim 6 of sufficient depth or width to give room for the requisite amount of carbid in the cells. The hub 7 of the feed-wheel turns about a central spindle 8. Radial partitions 9, secured to the outer surface of the hub and to the inner face of the rim 6, form cells or compartments 10. The number and holding capacity of these cells will vary in machines of different sizes or for apparatus of different capacities. A horizontal flange 11 is formed on or secured to each partition at the upper edge thereof, and immediately under said flanges rods 12 are arranged, said rods being rigidly secured at one end to the hub 7 and at the opposite end to the rim 6. Journaled upon the rods 12 are door-hangers or false partitions 13, to the lower edges of which the doors 14 are hinged. These doors form hinged bottoms for the cells, and they are held in closed positions by angle-levers or latches 15, pivoted at the outer surface of the rim 6. The latches shown have oppositely-bent ends, connected by pintels journaled in keepers 16 on the rim 6. The doors 14 are provided with lugs 17 at their outer corners, and the rim 6 is recessed at 18 to form seats for engagement of said lugs. One end of each latch 15 extends outward when the bottom or door of the cell is closed, and the purpose of this construction is that they may engage with a tripping device placed at the desired point on the compartment containing the feed-wheel and in the path of the outwardly-extending ends of the latches to turn the latches in the keepers to permit the door to drop by the weight of the carbid resting upon its upper surface, the door-hangers 13 aiding in this operation by swinging slightly out, thus forming inclined walls for the discharging-cell. The upper edge of the rim 6 is formed with a series of ratchet teeth or notches 19 for a purpose to be hereinafter referred to.

The compartment 20, within which the feed-wheel revolves, forms an enlarged extension of the generator-chamber 21. The bottom 22 of the compartment 20 has an opening 23 at a suitable point to receive the carbid as it is discharged from the cells 10. An inclined bottom or chute 24 is formed in the opening 23, and this chute leads to the generator-chamber 21 in such a way as to discharge carbid near the center of the generator. To prevent moisture from entering the carbid-cells from the generator-chamber, a hinged door or flap-valve 25 is pivoted at its upper edge within the generator and normally closes the entrance to the generator. When a carbid-cell is discharged on the inclined chute 24, the carbid slides down the incline and opens the door 25, and after the carbid has entered the generator from the chute the door or valve closes automatically. At a point substantially above the center of the opening 23 the inner wall of the compartment 20 is provided with a stop or tripping lug 26, projecting into the path of the latches 15 to turn them for opening the doors 14 of the cells 10 to discharge the carbid. Three pulleys 27, 28, and 29 are suitably journaled to the wall of the compartment 20, and a cable or chain 30 passes around said pulleys and through a guideway 31. A housing $31^b$, Fig. 13, is secured to the outer wall of the casing 1, and the cable or chain 30 is inclosed within this housing and passes up and out at the open top thereof. A weight $31^a$ is attached to one end of said cable or chain, and the opposite end thereof is connected to a connecting-rod 32. An arm 33, pivoted on the spindle 8, extends outward and into the guideway 31, where it is connected to the cable or chain. The arm 33 has a pawl 34, designed to engage the rachet-teeth 19.

The generator-chamber 21 has a hollow tube 36 journaled in the bottom thereof, and stirrer-arms 37 are secured to said tube. The upper end of said tube 36 is squared, as shown in section in Fig. $11^a$, in order that a crank or wrench 38, Fig. 11, may be applied thereto to stir the exhausted carbid when it becomes necessary to discharge it through the gate 39 prior to recharging the apparatus. When the exhausted carbid is to be removed from the generator, the cover 46 is removed from the generator. The arm 33 is then removed from the spindle 8, when the carbid-wheel can be lifted out and recharged. The wrench 38 may now be applied to the squared end of the tube 36, and the exhausted mass of carbid in the generator may be agitated by the stirrers until it is thoroughly mixed with the water in the generator. This mass can then be easily discharged through the gate 39. The tube 36 forms a bearing for the spindle 8 of the feed-wheel.

The outer casing 40 of the generator is made to substantially conform to the shape of the generator-chamber and the feed-wheel compartment, excepting in particulars to be hereinafter referred to. A water-supply tube 41 is connected to the casing 40, and at its upper end is provided with an inlet-opening 42 to receive water, which passes into the generator through the perforation 43 in the generator-wall. The tube 41 is divided by a partition $41^a$, which extending from the top thereof to a point near the bottom forms a trap or water seal to prevent the escape of gas from the generator. A water-tight cover 45 fits over the generator-chamber 21 and is provided with a central aperture to accommodate the tube 36. The cover 46, having a rim 47, which fits between the inner and outer casing of the feed-wheel compartment, has an idle cog-wheel 48 journaled within the housing 49, raised above the top wall of the cover. The idle cog-wheel is located at a point immediately above the chute 24 when the cover is in place, and the purpose of said cog-wheel is to push the carbid out of the cells, if by any chance the same should bind or clog when the door 14 is opened. Secured to the outer surface of the top of the cover 46 is a cross-bar 51, which fits under catches 52 on the outer casing 1. This cross-bar 51 has a central threaded aperture through it, and fitted to said aperture is a screw-threaded valve-stem 50, having a valve $a$ secured to one end thereof and a hand-wheel $b$ attached at the other end. The cover 46 also has cross-braces $c$, having hand-holds $d$ and a valve-seat $e$ for the valve $a$. The valve is packed or suitably constructed to be air-tight and is for the purpose of holding the cover down in place and to serve as a vent to permit the cover to be removed.

The gasometer 3 consists of an outer casing 54, which may be suitably connected to the generator, as by the connecting-plates 55. Secured in keepers upon the outer surface of the casing 54 are the upright guide-rods 56 for the bell 57, the latter being provided with the usual guides 58 for moving on the rods 56. Extending down into the bell at a central point is a tube 59, closed at its lower end and having an aperture-cap 60 at its upper end. A rod 61 extends through the aperture in cap 60 and down into the tube 59, and at the lower end of said rod a counterbalance-weight 62 is secured, which coming in contact with cap 60 as the bell 57 descends imparts motion to the carbid-wheel through rod 61, lever $66^a$, and rod 32. The upper end of rod 61 is provided with a hook 63, which hooks into clevis 66 on a lever $66^a$, the opposite end of the lever being similarly connected to the rod 32. A bifurcated cross-bar 67 extends across the top of guide-rods 56 and is suitably attached to the guide-rods to brace them and to serve as a guide for the lever $66^a$. Three pipes 68 69 70 have their open upper ends terminating near the upper inner wall or top of the bell 57. The pipe 68 leads from the generator and has a stop-cock 71, operated by a crank or lever 72. The handle of the crank 72 always occupies a position across the top of the cover 46 when the stop-cock 71 is open in order that the cock will always be closed before the cover 46 can be removed for recharging or for any other purpose. The pipe 69 is the safety or exhaust pipe and may be connected to a pipe leading out of the building. A pipe 69ᶜ surrounds the upper portion of pipe 69 and serves as a safety-valve. The purpose of this pipe is to permit the superfluous gas to escape, provided the pressure is excessive in the gasometer. The pipe 70 is the gas-supply pipe. These three pipes pass out of the gasometer and are each provided with a T 68ᵃ, 69ᵃ, and 70ᵃ. To the lower ends of these couplings short drain-pipes 68ᵇ, 69ᵇ, and 70ᵇ are connected. The open lower ends of these drain-pipes extend below the water-level in the water-can 73, suspended from the gasometer. The can 73 serves as a trap to catch refuse matter from the pipes 68, 69, and 70, and said can being filled with water an efficient seal is created for the drain-pipes.

An indicator or gage 5 is secured to the division-wall 55. This indicator consists of a casing having a sight-opening 75 and an inner disk 76, having gage-marks upon its outer surface and ratchet-teeth 77 upon its outer edge, equal in number to the compartments in the carbid-wheel. A spring-impelled arm 78 extends out of the casing in the path of a projection 79 on the bell. The arm 78 is normally thrown upward by the spring 80 and is carried down by the projection 79 one notch every time a cell is discharged and when the bell 57 is in a lowermost position, the gage registering by the turning of the disk operated by the arm 78.

The operation of the apparatus is as follows: After the machine has been permanently set up and the pipes properly connected, as described, the water-can 73 is filled, and a sufficient quantity of water placed in the generator to fill it and to form the water-seal, hereinbefore referred to. The carbid-cells 10 are then filled with calcium-carbid, each cell containing substantially the same amount, excepting the first one to be discharged, which may have but a small charge. The cover 46 is secured in place, and the lever 72 is turned to open cock 71. The cable or chain 30 is then raised by hand to deliver the contents of the first cell into the generator. The gas thus formed raises the bell 57, and as the gas is used from the gasometer the bell descends until the arm 78 on the indicator or gage 5 has been depressed to register the charge used. Then the cable or chain 30 having been raised by the descent of the bell rotates the feed-wheel one ratchet-tooth to bring another cell in position over the chute 24, and the lug 26 trips the latch 15 and discharges the contents of another cell into the generator, and as the gas formed by this charge enters the gasometer it raises the bell. When the bell again descends, it again registers and discharges another cell into the generator, and so on until all the cells have been discharged, when it is to be again refilled with carbid.

It will be apparent from the foregoing that by my apparatus gas is formed as fast as it is used from the gasometer by an automatic feeding device rendered operative by the amount of gas used and working either fast or slow, dependent upon the volume required or used. Another feature of importance in my apparatus resides in the fact that the feeding-chamber containing the carbid-wheel is entirely cut off from exposure to a water-surface, and as a result of such isolation the carbid may remain in the feeding-chamber an indefinite time without deterioration.

I do not wish to be understood as being restricted to the exact construction disclosed, as many changes in details may be resorted to without departing from the spirit or scope of my invention.

Having thus fully described my invention, what I claim is—

1. In an apparatus of the class described, a rotary cellular feed-wheel for containing carbid in its separate compartments, doors hinged to false partitions hung upon pivots within the cells, latches for holding the doors closed, a stop for operating the latches to open the doors, and pawl-and-ratchet mechanism for rotating the feed-wheel, step by step, in combination with a gasometer-bell and connections between said bell and ratchet mechanism to operate the latches to discharge the contents of the compartments singly into the generator by the movement of the bell, substantially as described.

2. The feed-wheel, consisting of a number of cells for containing carbid, and having hinged bottoms or doors, means for dropping the doors to discharge the contents of the cells into the generator, in combination with an idle cog-wheel located over the cells for assisting the discharge, substantially as described.

3. In an acetylene-gas machine, a rotary feed-wheel journaled above the generator, and consisting of a series of cells for containing carbid, partitions hinged within said cells, the bottoms or doors of said cells being hinged to the partitions, pivoted latches for holding the doors closed, and means for tripping the latches to let the doors drop and to swing the partitions to form inclined slides to discharge the carbid into the generator, substantially as described.

4. In an acetylene-gas machine, a rotary feed-wheel journaled above the generator, a series of cells in the feed-wheel, partitions hinged within the cells, doors pivoted to the partitions, pivoted latches for holding the doors up, means for tripping the latches to drop the doors and swing the partitions, and an idle cog above the discharge-opening for pushing the carbid out of the cells, substantially as described.

In testimony whereof I have hereunto set my hand in presence of two subscribing witnesses.

HARRIET B. ROBINSON.

Witnesses:
 BENJ. E. SCOTT,
 A. L. SCOTT.